US005488261A

United States Patent [19]

[11] Patent Number: 5,488,261
[45] Date of Patent: Jan. 30, 1996

Swoboda et al.

[54] CARBON BRUSH AND FASTENING A BRAIDED INDICATOR WIRE THEREIN

[75] Inventors: Anton Swoboda; Edmund Kubler, both of Vienna, Austria; Horst Ulm, Huttenberg; Gunter Schardt, Giessen-Klein-Linden, both of Germany

[73] Assignee: Schunk Kohlenstofftechnik GmbH, Heuchelheim, Germany

[21] Appl. No.: 241,363

[22] Filed: May 11, 1994

[30] Foreign Application Priority Data

May 11, 1993 [DE] Germany .......................... 43 15 622.3

[51] Int. Cl.[6] .................................................. H02K 13/00

[52] U.S. Cl. .......................... 310/249; 310/245; 310/251; 310/253

[58] Field of Search .................................... 310/248, 249, 310/242, 239, 245, 251, 252, 253; 340/635, 648, 540; 200/61.41

[56] References Cited

U.S. PATENT DOCUMENTS

| | | | |
|---|---|---|---|
| 1,188,635 | 6/1916 | Eynon | 310/294 |
| 1,441,640 | 1/1923 | Taylor | 310/249 |
| 2,199,532 | 5/1940 | Weeks | 310/249 |
| 4,333,095 | 6/1982 | Silva | 310/245 |
| 4,536,670 | 8/1985 | Mayer . | |
| 4,636,778 | 1/1987 | Corkran et al. . | |

FOREIGN PATENT DOCUMENTS

| | | | |
|---|---|---|---|
| 0023537 | 2/1981 | European Pat. Off. | 310/249 |
| 232209 | 8/1987 | European Pat. Off. . | |
| 512234 | 3/1992 | European Pat. Off. . | |
| 2223858 | 10/1974 | France . | |
| 2132053 | 1/1972 | Germany . | |
| 2804547 | 8/1979 | Germany . | |
| 8433023 | 2/1985 | Germany . | |
| 4111206 | 10/1992 | Germany . | |

*Primary Examiner*—R. Skudy
*Attorney, Agent, or Firm*—Dennison, Meserole Pollack & Scheiner

[57] ABSTRACT

The invention relates to a carbon brush (10) with a braided indicator wire (26), (28) for indicating a defined wear of the carbon brush. The braided indicator wire is embedded in a blind bore (30), and is disposed spaced apart from the bottom (32) of the blind bore. To assure an exact indication of the wear of the carbon brush, the bottom of the blind bore is covered with a layer (40) consisting of an insulating material.

11 Claims, 2 Drawing Sheets

CARBON BRUSH AND FASTENING A BRAIDED INDICATOR WIRE THEREIN

FIELD OF THE INVENTION

The invention relates to a carbon brush with a braided indicator wire for indicating a predetermined amount of wear of the carbon brush, wherein the braided indicator wire is embedded in a recess, such as a blind bore, preferably extending in the longitudinal direction of the carbon brush and is spaced apart from the bottom of the recess, and wherein insulating material is disposed on the bottom.

The invention further relates to a method for disposing and fastening a segment of the braided indicator wire in a carbon brush.

BACKGROUND OF THE INVENTION

It is required in machinery, particular that intended for commercial purposes, to indicate when the carbon brush has worn down to an extent that it shortly will be lifted off the commutator or collector ring of a motor by means of a disconnecting nipple embedded in the carbon brush. This indication takes place via a braided indicator wire which comes into conducting contact with the commutator or collector ring.

A plurality of steps are known in attempts to generate a signal only when a predetermined amount of wear has occurred. However, they basically do not provide assurance that a signal is triggered only after a previously predetermined amount of wear has taken place.

In accordance with French Patent Publication FR-A 2 223 858 it is provided to arrange a braided indicator wire in a sleeve made of an insulating material, of which at least sections extend inside an appropriately adapted recess of the carbon brush. Since the braided indicator wire itself is surrounded by an insulating material, there may be problems in arranging it exactly in the sleeve.

In accordance with EP 0 232 209 A1, optical wave guides are employed, through which optical signals are transmitted or received.

A carbon brush for collectors is known from DE 28 04 547 A1, wherein a braided indicator wire surrounded by an insulating sheath is disposed in an elongated bore. To position the braided indicator wire exactly, it is necessary to employ suitable adhesive materials. However, in case of jolts it cannot be assured that the braided indicator wire is not displaced.

To avoid these disadvantages, a pre-assembled plastic sleeve which can be inserted into a bore of a carbon brush has been provided in accordance with G 84 33 023 U1. The braided indicator wire itself is then inserted into the plastic part. The sleeve has been slitted so that the braided indicator wire remains in it. During insertion into the carbon brush, the braided indicating wire is clamped between two longitudinal halves of the sleeve which are movable in respect to each other. A large degree of exact fitting is required to assure that the braided indicating wire is clampingly received in the sleeve. Regardless of this, however, the sleeve can melt because of the high temperatures occurring in carbon brushes, so that the braided indicating wire is uncontrollably displaced.

As a remedy for this, EP 0 512 234 A2 proposes that the braided indicating wire is placed into a sleeve made of metal and is crimped together with it. This results in exact positioning of the braided indicating wire in the sleeve which, in turn, can be exactly positioned in an appropriately adapted bore of the carbon brush by means of a circumferential rim. The free end of the braided indicating wire projects past the sleeve. The free end of the braided indicating wire is at a distance from the bore in the carbon brush in which the sleeve is received. However, because of this a signal can be triggered prematurely if coal dust reaches the braided indicating wire when the bottom is being abraded.

Carbon brushes of the type mentioned at the outset can also be found in DE 41 11 206 A1 or DE-OS 21 32 053, for example. The braided indicating wires are enclosed at least on the inside or the outside in sleeves consisting of an insulating material to insulate them electrically from the carbon brush.

In accordance with U.S. Pat. No. 4,536,670 it is proposed to enclose the braided indicating wire in Teflon® to insulate it against a carbon brush. Since TEFLON is difficult to glue, it is necessary to insert the braided indicating wire twisted into a blind bore.

In accordance with U.S. Pat. No. 4,636,778, for fixing a braided indicating wire in a carbon brush the end of the braided indicating wire is inserted into a mini-carbon brush which, together with the braided indicating wire, is itself enclosed in an insulated sleeve which is glued in a blind bore of a carbon brush.

OBJECT OF THE INVENTION

It is the object of the present invention to improve a carbon brush of the type mentioned at the outset in such a way that a signal is only triggered via the braided indicating wire if wear has actually occurred to an impermissible extent. Therefore a premature signal cannot be issued. Furthermore, it is intended to provide simplification of the manufacturing process which, however, at the same time permits checking to determine whether the braided indicating wire has been correctly arranged in the carbon brush.

Regarding the device, this object is essentially attained in that the insulating material is an inherently rigid insulating layer covering the bottom of the recess. The insulating layer, such as an insulating plate or insulating lamina, can consist of a fiber material or resin-bonded paper such as is known from transformer technology, for example, and sold under the name PERTINAX®.

To assure exact positioning of the braided indicating wire inside the recess, the free end of the braided indicating wire should touch the insulating layer, such as an insulating plate, i.e. it should preferably be seated on it.

So as to assure that a live contact between the braided indicating wire and carbon brush dust stemming from the lateral wall of the recess does not result in premature triggering of a signal, in accordance with a further embodiment of the invention it is provided that the braided indicating wire is laterally surrounded by an insulating material in the form of a tamped-down powder, i.e. that it is compressed by it. This can be a thermosetting material or mixtures of thermosetting materials which are sold under the name MINOLITE®, for example.

In accordance with a further embodiment of the invention the braided indicating wire, in particular its core, is arranged inside the recess in such a way that there is an even distance all around between the core and the lateral wall or bottom of the recess.

To assure defined conditions, the bottom of the recess should extend vertically or essentially vertically in relation to its inner wall. In other words, the recess should be a blind bore with a level bottom surface.

For carbon brushes of larger sizes (cross-sectional surface preferably larger than 10×8 $mm^2$), the braided indicating wires should be enclosed in sleeves made of metal, for example, such as crimped sleeves. These can be preassembled on the braided indicating wires in automatic assemblers, so that there are no disadvantages in respect to production.

The sleeves result on the one hand in a satisfactory seating of the braided indicating wire in the bore and, on the other hand, an increased mechanical stability is achieved (increase in pull-out resistance).

However, the sleeve should end at a distance from the free end of the braided indicating wire. Advantageously the upper end should extend below the plane defined by the surface of the carbon brush. However, this is not an absolutely necessary requirement.

In accordance with a further embodiment of the invention, a coating covering the tamped-down powder is provided between the braided indicating wire and the surface of the carbon brush to offer additional protection against the uncontrolled loosening of the braided indicating wire in the recess.

A method for disposing and fastening a segment of the braided indicator wire in a carbon brush is distinguished by the following method steps:

- a blind bore with a level or essentially level bottom is drilled,
- an inherently rigid insulating layer, such as an insulating plate covering the bottom of the blind bore, is inserted,
- if desired, a sleeve enclosing the braided indicator wire is preassembled,
- the section of the braided indicator wire is inserted into the blind bore until its end touches the insulating plate,
- the braided indicator wire is embedded in insulating material and, if required, the tamped-down powder is coated.

For adapting the size of the inherently rigid insulation layer, such as an insulating plate or lamina, in a simple manner to the cross section of the blind bore and to place it on its bottom, it is provided that a flat insulation material, which is wound off a roll, is placed over the bore and insulating plates are punched out of it by means of a stamping tool. The insulating plate or lamina is inserted into the blind bore by means of the stamping tool or of a die. Additionally and if desired it is possible for a matrix to be placed between the carbon brush and the insulating material strip to make punching-out of the insulating plate or lamina easier.

In accordance with a further preferred embodiment of the invention it is proposed that the braided indicating wire is cut to size by means of a cutting tool, such as a wire cutter, wherein a voltage is applied between the cutting tool and the carbon brush to check the insulated placement of the braided indicating wire section in the blind bore.

It is possible by means of these steps to determine in the course of cutting the braided indicating wire to size whether it is electrically insulated in respect to the carbon brush or whether there is an electrically conducting connection, for example because of faults in the material or improper assembly, which would result in the respective carbon brush being unusable.

Further details, advantages and features of the invention ensue not only from the claims or the features which can be found in them—by themselves and/or in combination—, but also from the subsequent description of an exemplary embodiment to be taken from the drawings.

DETAILED DESCRIPTION OF THE DRAWINGS

Figure 1:
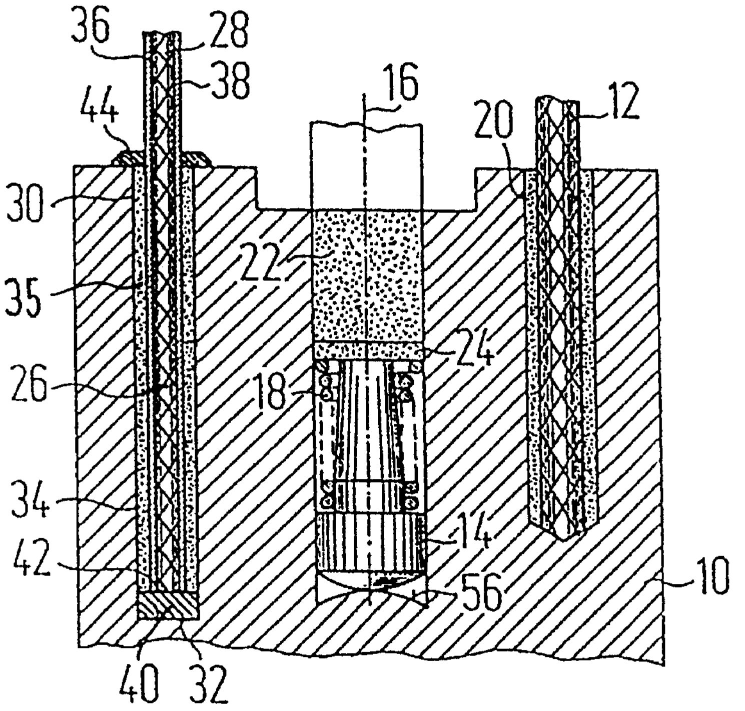
FIG. 1, a carbon brush designed in accordance with the invention in a sectional view and a partial view, FIG. 2, a partial view of the carbon brush of FIG. 1, FIG. 3, a basic representation of a method step for disposing an insulating plate in a blind bore, and FIG. 4, a partial view of a further embodiment of a carbon brush designed in accordance with the invention.

In the drawing figures, wherein like elements are indicated by the same reference numerals, respectively a part of a carbon brush (10) is shown, in which a live braided wire (12) as well as a disconnecting nipple (14) are disposed. The disconnecting nipple (14) is made of an insulating material and is compressed in the direction of the longitudinal axis (16) of the carbon brush (10), preferably by means of a helical spring (18).

The braided wire (12) as well as the disconnecting nipple (14) are embedded in a tamped-down powder such as a metal powder (20) or (22). An insulating plate (24) can additionally be disposed between the tamped-down powder 22 covering the disconnecting nipple (14) and the front facing it, on which the helical spring (18) is supported.

Furthermore, a portion (26) of a braided indicating wire (28) extends inside the carbon brush (10), by means of which a signal is triggered when the carbon brush (10), which is in operational contact with a commutator or collector ring, not shown, is worn to an extent where a replacement is necessary, i.e. before the carbon brush is used up to such an extent that the disconnecting nipple (14) is exposed and operates to lift the carbon brush (10) off the collector ring or the commutator.

The braided indicating wire (28) is disposed in a blind bore (30) which essentially extends parallel to the longitudinal axis (16), and the bottom surface (32) of which is embodied to be level, i.e. extends vertically or essentially vertically in respect to the inner wall (34) of the blind bore.

The bottom surface (32) is covered with an insulating plate or lamina (40), which can be made of a fiber material or resin-bonded paper, for example, to assure on the one hand the exact positioning of the section (26) of the braided indicating wire (28) and, on the other hand, to prevent coal dust generated when the commutator or connecting ring abrades the bottom (32), to make a live connection between the carbon brush (10) and the braided indicating wire (28) i.e. with its conducting core (36) which is enclosed by an insulating sheath (38). In this case the free end (42) of the core (36) is seated on the insulating plate (40).

In this case the insulating sheath (38) enclosing the core (36) can extend as far as the surface of the insulating plate or insulated at a distance from it, as has been shown in FIG. 1.

The circumference of the portion (26) of the indicating wire is embedded in an insulating tamped-down powder (35) which is or contains a thermosetting material. Preferably a material sold under the name Minolite® can be used.

Figure 2:
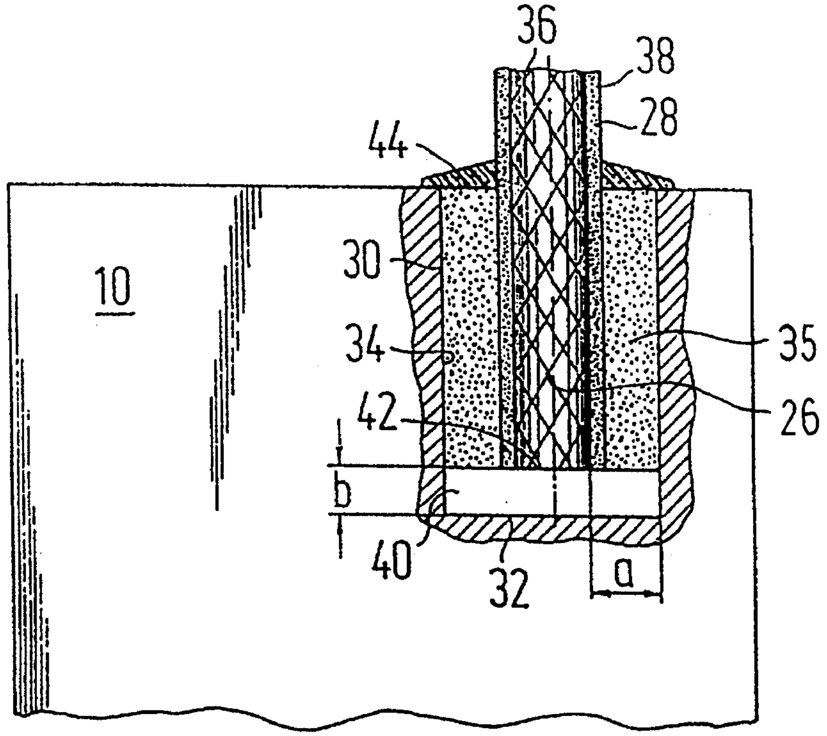

FIG. 2 is presented to explain how the cross section of the blind bore (30) is related to the cross section of the core (36) of the portion (26) of the braided indicating wire (28)

enclosed in the insulating sheath (38). As shown, the thickness (b) of the insulating plate (40) is selected to be equal to the distance a between the core (36) and the inner surface of the blind bore (30).

After the portion (26) has been embedded in the blind bore (30), the outside of the tamped-down powder (35) is covered with a coating (44) extending from the surface of the carbon brush (10) to the outside of the insulating sheath (38). Such coating protects against loosening of the wire in the recess.

Figure 3:
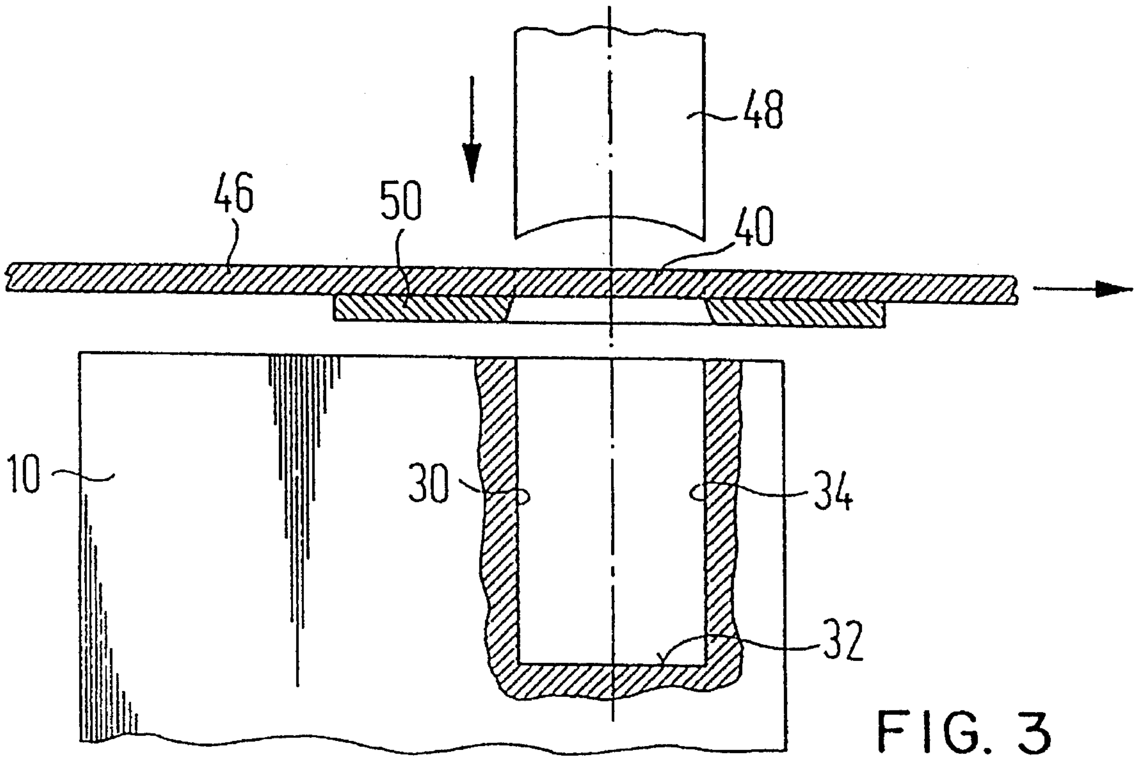

As is made clear from inspection of FIG. 3, a flat insulation ribbon (46), which is wound off a roll, is moved over the blind bore opening in order to be punched out directly above the blind bore (30) by means of a stamping tool (48) and inserted into the blind bore by means of the stamping tool. A support matrix (50) can be provided between the carbon brush (10) and the material of the insulating ribbon (46).

The braided indicating wire (28) itself is also wound off a roll and cut to the desired size. Cutting is performed after the portion (26) has been embedded in the blind bore (30). At the same time a voltage of, for example, 500 V is applied to the cutting tool during cutting and voltage is measured at the carbon brush (10). If the portion (26) is disposed insulated in the blind bore (30), a live connection between the cutting tool (48) and the carbon brush (10) should not be detected. A quality control results from this step which takes place simultaneously with the installation of the braided indicating wire (28) in the carbon brush (10).

The diameter of the blind bore (30) can be 2.5 mm, for example, with a height of 5.3 mm. Typical dimensions of the cross section of the braided indicating wire (28) including the insulating sheath (38) are approximately 1.1 mm, wherein the insulating sheath (38) can have a thickness in the range between 0.125 and 0.25 mm. The thickness (b) of the insulating plate (40), and therefore the distance a between the core (36) of the braided indicating wire (28) and the inner wall (34) of the blind bore (30), can be in the range of approximately 0.7 mm.

In connection with the insulating sheath (38) it should be noted, that it should be made for example of a polyester elastomer, Teflon® or other temperature-resistant insulation. The coating (44) should be a two-component adhesive on the basis of epoxy resin.

Figure 4:
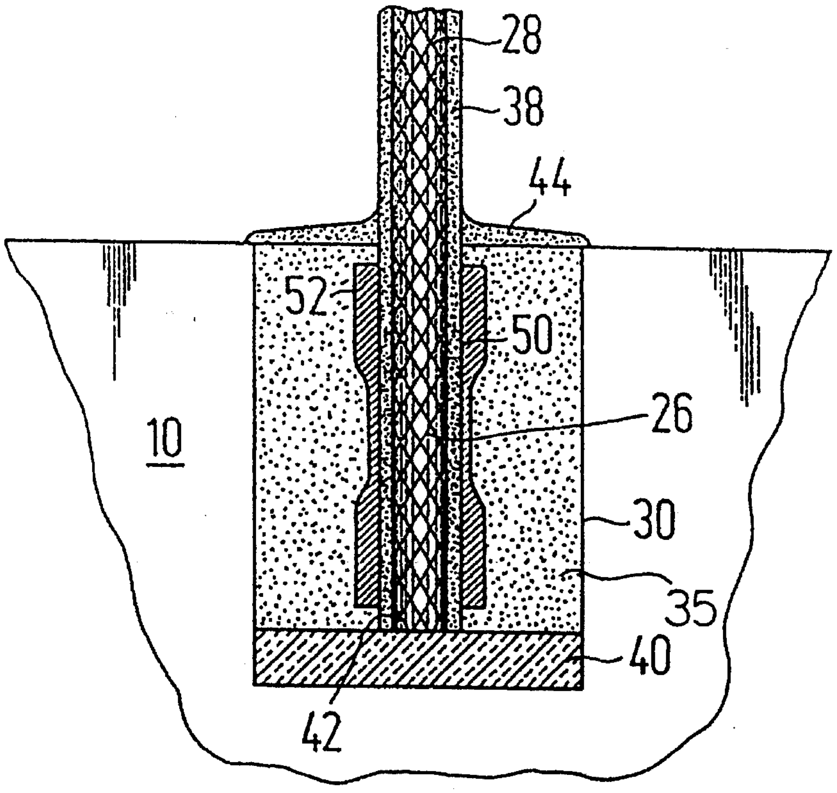

A further embodiment of the teaching of the invention can be taken from FIG. 4. As shown in the figure, the braided indicating wire portion (26) enclosed inside the blind bore (30) is in turn enclosed in a sleeve (50), such as a crimped sleeve, preferably made of metal.

The crimped sleeve (50) ends at a distance from the free end (42) of the portion (26) of the braided indicating wire (28). The outside of the sleeve should also be completely surrounded by tamped-down powder. This means that the upper rim (52) is covered by tamped-down powder, i.e. it extends below the plane which is defined by the surface of the carbon brush (10).

Because of the sleeve there is, on the one hand, a satisfactory seating of the braided indicating wire (28) in the blind bore (30) and, on the other hand, an increased mechanical stability is achieved, i.e. the pull-out resistance is increased.

Enclosing the braided indicating wire portion (26) with the sleeve (50) should be provided in particular with carbon brushes of larger size. These are those with cross-sectional surfaces of preferably 10×8 $mm^2$ or more.

We claim:

1. A carbon brush (10) extending in a longitudinal direction (16) from a contact surface with an indicator wire (28) for indicating a predetermined amount of wear of the carbon brush, a recess (30) is formed in the carbon brush, a portion (26) of the indicator wire is embedded in the recess which is in the form of a blind bore extending in the longitudinal direction of the carbon brush, said indicator wire comprising a braided conductive core (36) surrounded by an insulating sheath (38) and having a free conductive end (42), said portion (26) being spaced apart from flat bottom (32) of the recess, and insulating material disposed on the bottom, said insulating material forming an inherently rigid insulating layer (40) covering the bottom.

2. A carbon brush in accordance with claim 1, wherein the insulating layer is in the form of an insulating plate (40).

3. A carbon brush in accordance with claim 1, wherein the insulating layer consists of a fiber material.

4. A carbon brush in accordance with claim 1, wherein the conductive end (42) of the indicator wire touches the insulating layer (40) and rests on it.

5. A carbon brush in accordance with claim 1, wherein the portion (26) of the indicator wire is embedded in an insulating material (35), such as tamped-down powder.

6. A carbon brush in accordance with claim 5, wherein the tamped-down powder and the material of the insulating layer (40) have substantially the same specific resistances.

7. A carbon brush in accordance with claim 5, further including a coating (44) covering the tamped-down powder so as to extend between the the insulating sheath (38) and a surface of the carbon brush.

8. A carbon brush in accordance with claim 1, wherein the portion (26) of the indicator wire (28) is enclosed by a sleeve (50) consisting of metal, such as a crimped sleeve, an outside and rim of the sleeve are completely enclosed by tamped-down powder.

9. A carbon brush in accordance with claim 1, wherein the insulating layer consists of a resin-bonded paper.

10. A carbon brush (10) extending a longitudinal direction (16) from a contact surface with an indicator wire (28) for indicating a predetermined amount of wear of the carbon brush, a recess (30) is formed in the carbon brush, a portion (26) of the indicator wire is embedded in the recess which is in the form of a blind bore extending in the longitudinal direction (16) from a flat bottom (32) of the carbon brush, said indicator wire comprising a braided conductive core (36) surrounded by an insulating sheath (38) and having a free conductive end (42), said portion (26) being spaced apart from the flat bottom of the recess, insulating material disposed on the bottom, said insulating material forming an inherently rigid insulating layer (40) covering the bottom and a thickness (b) of the insulating layer being equal to a distance (a) between outside of said conductive core (36) and an inner wall of said recess (30).

11. A carbon brush with an indicator wire for indicating a predetermined amount of wear, comprising:

a carbon brush (10) extending in a longitudinal direction (16) from a contact surface, a recess (30) in the form of a blind bore having an axis substantially parallel to said longitudinal direction, an inner wall (34) and a flat bottom (32) perpendicular to the longitudinal direction, insulating material disposed on the flat bottom said insulating material forming a layer (40) having a predetermined thickness (b), an indicator wire (28) comprising a braided conductive core (36) surrounded by an insulating sheath (38), a portion (26) embedded in a center of said recess so that the conductive core (36) touches the insulating layer, and insulating, thermosetting material filling a space between said inner wall of said bore and the indicator wire.

* * * * *